(12) United States Patent
Tada et al.

(10) Patent No.: US 7,947,245 B2
(45) Date of Patent: May 24, 2011

(54) METHOD FOR PRODUCING NANOCARBON AND CATALYTIC REACTION DEVICE FOR PRODUCING NANOCARBON

(75) Inventors: Akio Tada, Kitami (JP); Satoru Nakamura, Muroran (JP); Tetsunari Nakamura, Muroran (JP); Hajime Kakihara, Muroran (JP); Yoshitaka Togo, Minato-ku (JP); Kikuo Koseki, Chofu (JP); Hiroyuki Takasuna, Minato-ku (JP)

(73) Assignees: National University Corporation Kitami Institute of Technology, Hokkaido (JP); The Japan Steel Works, Ltd., Tokyo (JP); Kajima Corporation, Tokyo (JP)

( * ) Notice: Subject to any disclaimer, the term of this patent is extended or adjusted under 35 U.S.C. 154(b) by 644 days.

(21) Appl. No.: 11/378,363

(22) Filed: Mar. 20, 2006

(65) Prior Publication Data
US 2006/0228286 A1    Oct. 12, 2006

(30) Foreign Application Priority Data
Apr. 12, 2005   (JP) ............................... P2005-114302

(51) Int. Cl.
  *C01B 31/00*  (2006.01)
  *D01C 5/00*  (2006.01)
  *B01J 19/08*  (2006.01)
  *C09C 1/00*  (2006.01)
  *C09C 3/00*  (2006.01)

(52) U.S. Cl. ............ 423/445 B; 423/445 R; 423/447.3; 422/150; 422/152; 977/842; 977/843

(58) Field of Classification Search .................. None
See application file for complete search history.

(56) References Cited

U.S. PATENT DOCUMENTS
2002/0131910 A1 * 9/2002 Resasco et al. ............... 422/139
2006/0099134 A1   5/2006 Maruyama et al.

FOREIGN PATENT DOCUMENTS
| JP | 10-182121 | A |   | 7/1998 |
| JP | 2002-211909 | A |   | 7/2002 |
| JP | 2003-535794 | A |   | 12/2003 |
| JP | 2004-261771 | A |   | 9/2004 |
| JP | 2006-45051 | A |   | 2/2006 |
| JP | 2006045051 | A | * | 2/2006 |
| WO | WO 2004/007820 | A1 |   | 1/2004 |

* cited by examiner

*Primary Examiner* — Melvin C Mayes
*Assistant Examiner* — Guinever S Gregorio
(74) *Attorney, Agent, or Firm* — Sughrue Mion, PLLC

(57) ABSTRACT

A cylindrical screw feeder main body, catalyst feeding portions for introducing a catalyst into the screw feeder main body, low hydrocarbon feeding portions for introducing a low hydrocarbon into the screw feeder main body as a raw material, a screw for conveying the catalyst and nanocarbon produced by pyrolysis of the low hydrocarbon in the feeder main body, a solid matter discharging portion for discharging the catalyst and the nanocarbon conveyed by the screw out of the screw feeder main body and a gas discharging portion for discharging the unreacted low hydrocarbon and hydrogen produced by the pyrolysis of the low hydrocarbon out of the screw feeder main body are provided. Nanocarbon grown with the catalyst as top with time is continuously discharged out of the screw feeder main body while unused catalyst is being fed thereto at the same amount as that of nanocarbon, allowing efficient continuous reaction.

8 Claims, 4 Drawing Sheets

RESULTS OF XRD ANALYSIS OF NICKEL
CATALYST BEFORE AND AFTER USE

# METHOD FOR PRODUCING NANOCARBON AND CATALYTIC REACTION DEVICE FOR PRODUCING NANOCARBON

This application is based on Japanese Patent Application No. 2005-114302, which is incorporated herein by reference.

BACKGROUND OF THE INVENTION

1. Field of the Invention

The present invention relates to a method for the production of nanocarbon which comprises subjecting a low hydrocarbon such as methane as a raw material to catalytic reaction so that the raw material is directly decomposed to produce nanocarbon and hydrogen and a catalytic reaction device for producing nanocarbon.

2. Description of the Related Art

As a device for producing nanocarbon from a low hydrocarbon as a raw material there has been heretofore known a carbon dioxide fixing device as disclosed in JP-A-10-182121. This fixing device is intended to fix mainly carbon dioxide using methane and carbon dioxide as raw material. This fixing device employs a process for producing carbon and water using an existing reaction called Bosch reaction. This device also employs a fluidized bed process to effect continuous reaction. In this process, carbon grown on a catalyst and the catalyst are continuously separated and withdrawn by a so-called centrifugal separation process.

In general, chemical reactors using a catalyst can be roughly divided into three types, i.e., fixed bed type, moving bed type, fluidized bed type. In all these types of chemical reactors, the catalyst doesn't change itself with reaction. However, the process for the production of nanocarbon involving the reaction of a low hydrocarbon in the presence of a catalyst (hereinafter referred to as "present process") is a catalytic reaction process by which as the reaction proceeds, a functional nanocarbon grows with a fine metal catalyst used as top, causing the rise of the volume of the catalyst itself. Therefore, when the fixed bed process is used in the present process, the reaction space is gradually filled with and blocked by grown carbon, preventing the raw material gas from flowing therethrough and hence disabling continuous reaction to disadvantage. Ordinary moving beds are essentially used mainly in large-sized combustion devices such as stoker furnace. The reaction at the step of combusting a combustible material with excessive air involves exothermic reaction that proceeds continuously. However, the application of ordinary moving bed process to the present process, which involves endothermic reaction, results in the deterioration of reaction efficiency and energy efficiency that adds to cost. Further, the fluidized bed process requires that the distribution of particle size of catalyst in the bed be optimized to keep the fluidized state optimum. In the present process, however, the volume and weight of catalyst change with time, making it difficult to control the distribution of particle size of catalyst in the bed.

It is therefore necessary that the catalyst which is continuously growing be withdrawn using a fluidized bed provided with a centrifugal separating machine as in the process disclosed in JP-A-10-182121. It is also necessary that when the raw material gas is used also as a fluidic gas in the case where the catalyst bed is suspended or turned, the gas flow rate needs to satisfy both the fluidization optimization conditions and the reaction optimization conditions. However, the present process reaction doesn't proceed so fast. SV value of the raw material gas is preferably as low as possible. On the other hand, in order to use cyclone or make gyration flow, the gas flow rate needs to be higher than that required to attain SV value for optimum reaction. It is thus made difficult for the aforementioned centrifugal separation type fluidized bed to make efficient practice of the present process. Further, the fluidized bed requires a large-sized apparatus that adds to construction cost. Therefore, it is usual that catalytic reactions which can never be effected in other processes are effected in fluidized bed process.

SUMMARY OF THE INVENTION

The invention has been worked out to solve the aforementioned problems with the related art techniques. A basic object of the invention is to continuously keep the catalytic reaction proceeding under optimum conditions in the present process. Another aim of the invention is to keep constant conversion (percent conversion) of low hydrocarbon calculated from the material balance between the inlet and outlet of the reactor by continuously replenishing the reactor with a virgin catalyst.

That is, according to a first aspect of the invention, there is provided a method for producing nanocarbon comprising continuously feeding a low hydrocarbon and a catalyst through a screw feeder in such a manner that the two components are brought into contact with each other in a forward current or counter flow so that the low hydrocarbon is pyrolyzed over the catalyst in the screw feeder to produce a composite of nanocarbon while continuously conveying the composite of nanocarbon formed on the catalyst by pyrolysis and the catalyst by the screw toward the downstream side of the screw feeder from which it is then discharged out of the screw feeder.

According to a second aspect of the invention, the catalyst is a first metal composed of one or both of nickel and iron optionally comprising one or both of palladium and cobalt incorporated therein.

According to a third aspect of the invention, the low hydrocarbon is passed through the screw feeder at an SV value of from 1,000 to 500,000 ml/g-catal./h with respect to the catalyst packed in the screw feeder while the screw feeder is being adjusted to a temperature of from 400° C. to 900° C. and a pressure of 10 atm or less.

According to a fourth aspect of the invention, the catalyst is spherical, foil-shaped, whisker-shaped or amorphous, singly or in combination.

According to a fifth aspect of the invention, the screw of the screw feeder is operated back and forth so that the residence time of nanocarbon thus produced is not only controlled by the rotary speed of the screw but also is prolonged by the rear and forward operation of the screw to raise the carbon to metal ratio (value obtained by dividing the molecule number of carbon atoms produced by the molar ratio of the catalyst metal) representing the degree of growth of carbon.

According to a sixth aspect of the invention, there is provided a nanocarbon producing reactor comprising a cylindrical screw feeder main body as a pressure reaction vessel, a catalyst feeding portion for introducing a catalyst into the screw feeder main body, a low hydrocarbon feeding portion for introducing a low hydrocarbon into the screw feeder main body as a raw material, one or a plurality of screws rotatably disposed in the screw feeder main body for conveying the catalyst and nanocarbon produced by pyrolysis of the low hydrocarbon in the feeder main body, a solid matter discharging portion disposed in the screw feeder main body for discharging the catalyst and the nanocarbon conveyed by the screw out of the screw feeder main body and a gas discharging portion disposed in the screw feeder main body for discharging the unreacted low hydrocarbon and hydrogen produced by the pyrolysis of the low hydrocarbon out of the screw feeder main body.

According to a seventh aspect of the invention, the catalyst feeding portion is provided with a catalyst constant rate feeding device capable of feeding a catalyst into the screw feeder main body at a constant rate per unit time.

According to an eighth aspect of the invention, the catalyst feeding portion is provided with a catalyst constant rate feeding device capable of feeding a catalyst into the screw feeder main body at a constant rate per unit time.

According to a ninth aspect of the invention, the nanocarbon producing reactor further comprising a heating unit for adjusting the temperature in the screw feeder main body, a pressure adjusting unit for adjusting the pressure in the screw feeder main body and a flow rate adjusting unit for adjusting the flow rate of the low hydrocarbon to be fed into the screw feeder main body.

According to a tenth aspect of the invention, the screw of the screw feeder has a through-hole provided in the center of the shaft thereof and a small hole connected to the through-hole disposed in its pitch so that the raw material gas is ejected through the hole formed in the pitch of the screw from one end of the central hole of the screw.

According to an eleventh aspect of the invention, the shape of the screw and the reactor have a combination defined by Reuleaux's curve of constant width.

Incidentally, the term "Reuleaux's curve of constant width" as used herein is meant to indicate a combination of a screw having a certain shaft section with a reactor that can cope with the rotation of the screw such as combination of a screw which corner has a triangular section free of C surface (rounded corner which is not sharp) with a reactor having a rectangular section or combination of a screw which corner has a pentagonal section free of C surface with a reactor having a hexagonal section.

According to a twelfth aspect of the invention, the screw and the reactor are disposed vertically or horizontally in the longitudinal direction.

According to a thirteenth aspect of the invention, the screw feeder has a wider or narrower pitch and a greater or smaller height toward the forward end and one such a screw feeder or a plurality of such screw feeders are provided in the reactor.

According to a fourteenth aspect of the invention, wherein the screw of the screw feeder can be operated back and forth to adjust the residence time of nanocarbon in the screw feeder.

As mentioned above, the method for producing nanocarbon of the invention comprises continuously feeding a low hydrocarbon and a catalyst through a screw feeder in such a manner that the two components are brought into contact with each other in a forward current or counter flow so that the low hydrocarbon is pyrolyzed over the catalyst in the screw feeder to produce a composite of nanocarbon while continuously conveying the composite of nanocarbon formed on the catalyst by pyrolysis and the catalyst by the screw toward the downstream side of the screw feeder from which it is then discharged out of the screw feeder, whereby nanocarbon which has grown with the catalyst as top with time can be continuously discharged out of the reaction pipe while unused catalyst is being fed to the screw feeder at the same amount as that of nanocarbon, allowing efficient continuous reaction.

In the present reaction, the portion which is taken into the surface of the catalyst or grown carbon to take part in the reaction decreases with time or depending on the reaction conditions, making it difficult for the catalytic reaction to proceed. In the invention, however, a two-faced catalyst/product which is a material that can difficultly cause reaction as a catalyst but is a completed nanocarbon product is withdrawn from the reactor while replenishing with unused catalyst, making it possible to keep conversion of low hydrocarbon at the inlet and outlet of the reactor constant.

Further, the nanocarbon producing reactor of the invention a cylindrical screw feeder main body as a pressure reaction vessel, a catalyst feeding portion for introducing a catalyst into the screw feeder main body, a low hydrocarbon feeding portion for introducing a low hydrocarbon into the screw feeder main body as a raw material, one or a plurality of screws rotatably disposed in the screw feeder main body for conveying the catalyst and nanocarbon produced by pyrolysis of the low hydrocarbon in the feeder main body, a solid matter discharging portion disposed in the screw feeder main body for discharging the catalyst and the nanocarbon conveyed by the screw out of the screw feeder main body and a gas discharging portion disposed in the screw feeder main body for discharging the unreacted low hydrocarbon and hydrogen produced by the pyrolysis of the low hydrocarbon out of the screw feeder main body, whereby the aforementioned effect can be certainly exerted and a compact device can be designed to provide an inexpensive device.

DETAILED DESCRIPTION OF THE PREFERRED EMBODIMENTS

Figure 1:
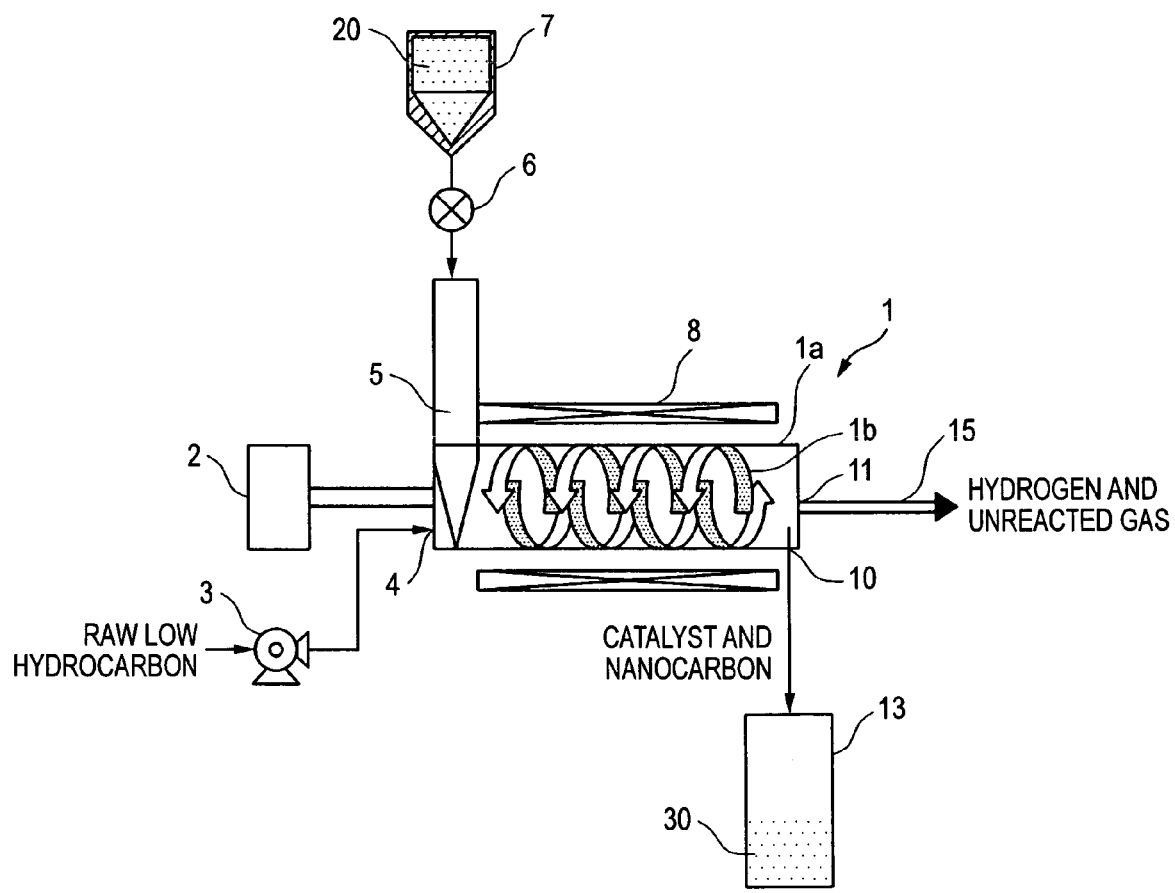
FIG. 1 is a conceptional diagram illustrating the screw feeder type catalytic reactor according to an embodiment of implementation of the invention.

In accordance with the invention, a low hydrocarbon which is continuously introduced into the screw feeder is pyrolyzed by catalytic reaction to produce nanocarbon and hydrogen. The pyrolysis causes the longitudinal growth of nanocarbon having almost the same diameter as that of a fine catalyst that doesn't change itself in ordinary catalytic reaction with the diameter thereof remained the same with the catalyst as top. In this manner, nanocarbon having a diameter of 100 nm or less can be produced, though depending on the fineness of the catalyst used. The aforementioned catalyst and nanocarbon are then continuously conveyed toward the downstream side from which they are efficiently discharged out of the feeder. On the other hand, hydrogen produced by the pyrolysis of the low hydrocarbon and the unreacted low hydrocarbon are discharged out of the screw feeder. As mentioned above, the catalyst and nanocarbon are continuously discharged out of the screw feeder. Therefore, produced carbon prevents the occurrence of pressure drop to an extent such that the inflow of low hydrocarbon as raw material into the screw feeder can be impeded. The screw feeder allows the discharge of the aforementioned catalyst and nanocarbon, the discharge of low hydrocarbon and hydrogen, and the continuous introduction of low hydrocarbon as raw material and unused catalyst. In this manner, a catalytic reaction providing a constant conversion can be continuously and stably effected.

A representative example of the low hydrocarbon employable herein is methane. In addition, there may be exemplified ethane, propane, and butane. These low hydrocarbons may be used singly or in combination. The kind of the catalyst to be used in the decomposition of the low hydrocarbon is not specifically limited. A representative example of the catalyst to be used herein is a first metal composed of one or both of nickel and iron. In addition, there may be exemplified a first metal comprising a second metal composed of one or both of palladium and cobalt incorporated therein. The catalyst is preferably in a fine shape. For example, a fine metal catalyst having a particle diameter of from several nanometers to hundreds of nanometers may be used singly. Alternatively, a catalyst having such a fine metal catalyst supported on a powdered alumina or silica carrier having a particle diameter of from several micrometers to hundreds of micrometers may be used. The shape of the catalyst to be used herein is not necessarily defined as mentioned above but is preferably spherical with a uniform diameter to have as great a contact area with respect to gas as possible.

As the reactor in which the low hydrocarbon and catalyst are received for catalytic reaction, there is used a screw feeder having a screw incorporated therein. The screw feeder utilizes the rotation of the screw to convey the contents of the screw feeder main body. The configuration of the screw feeder is not specifically limited. The screw may be monoaxial or biaxial or higher. The screw may be adjusted in its rotary speed or may be operated back and forth to adjust the residence time of the contents. By prolonging the residence time, the carbon to metal ratio (value obtained by dividing the molecule number of carbon atoms produced by the molar ratio of the catalyst metal) representing the degree of growth of carbon can be raised.

Further, the screw of the screw feeder may have a through-hole provided in the center of the shaft thereof and a small hole connected to the through-hole disposed in its pitch so that the raw material gas is ejected through the small hole formed in the pitch of the screws from one end of the through-hole of the screw, making it possible to accelerate the contact with the catalyst.

The shape of the screw and the reactor may have a combination defined by Reuleaux's curve of constant width. The screw feeder may have a wider or narrower pitch and a greater or smaller height toward the forward end so as to change the longitudinal conveying speed or power.

The screw feeder is preferably fed with a catalyst at a constant rate per unit time. The feeding of the catalyst can be accomplished by means of a catalyst constant rate feeding device. The configuration of the catalyst constant rate feeding device is not specifically limited herein. A known feeder such as rotary feeder may be exemplified. Further, the screw feeder is preferably fed with a low hydrocarbon at a constant rate. The feeding of the low hydrocarbon can be accomplished by means of a properties constant rate feeding device. The configuration of the constant rate feeding device is not specifically limited herein. The preferred constant feeding rate of catalyst depends on the amount of the gas to be reformed and suffices if SV value ranges from 1,000 to 500,000 ml/g-cat/h.

The screw feeder preferably allows the passage of a low hydrocarbon at a predetermined flow rate. Referring to the predetermined flow rate, it is required that SV value, which is an index with respect to catalyst, range from 1,000 to 500,000 ml/g-catal./h. When this value falls below 1,000, a large-sized device is needed, adding to the cost. On the contrary, when this value exceeds 500,000, the resulting catalytic properties are deteriorated. Thus, the above defined range is preferred. More preferably, the lower limit of the flow rate of the low hydrocarbon is about 3,000 ml/g-catal./h and the upper limit of the flow rate of the low hydrocarbon is about 50,000 ml/g-catal./h.

The screw feeder which acts as a reactor allows efficient catalytic reaction when the temperature and pressure in the screw feeder main body are properly controlled.

The temperature in the screw feeder main body can be controlled by the operation of a heating unit. As such a heating unit there may be used a electric heater, furnace or the like. The heating unit is not specifically limited herein. For example, the combustion heat of the unused low hydrocarbon discharged from the screw feeder main body may be utilized. The heating temperature in the screw feeder main body is from 400° C. to 900° C. This is because when the heating temperature falls below 400° C., the catalytic reaction cannot be smoothly effected. On the other hand, when the heating temperature exceeds 900° C., the catalyst can undergo thermal destruction or the required device needs to be designed with a high temperature material that adds to the cost. More preferably, the lower limit of the heating temperature is 600° C. and the upper limit of the heating temperature is 800° C.

Further, the screw feeder can be controlled in the pressure in the feeder main body by the operation of a pressure adjusting unit. As such a pressure adjusting unit there may be used a back pressure adjustor. However, the pressure adjusting unit is not specifically limited herein. The preferred pressure is 10 atm or less. This is because when the pressure in the feeder exceeds 10 atm, the High Pressure Gas Regulations require that the device be designed for high pressure gas, adding to the cost. Further, taking into account chemical equilibrium, when the pressure in the feeder rises, the resulting conversion lowers to disadvantage from the standpoint of reaction efficiency.

During the movement of the screw feeder, the moving speed of the screw feeder is not specifically limited. In order to effect continuous reaction, the amount of used catalyst to be discharged out of the screw feeder and the amount of unused (virgin) catalyst to be fed to the screw feeder are predetermined to be the same as each other.

The material discharged from the screw feeder is a composite material having a catalytic metal provided on nanocarbon. In the case where a catalyst supported on a carrier such as alumina is used, a composite of the aforementioned material with a carrier is discharged. In the case where only nanocarbon is needed, the composite material, if produced in the presence of a unsupported catalyst free of carrier (see JP-A-2004-261771), can be washed with an acid to obtain only nanocarbon.

The unreacted low hydrocarbon discharged from the screw feeder and hydrogen produced by the pyrolysis of the low hydrocarbon can be fed to the subsequent step where the hydrogen can then be separated and recovered and the unreacted low hydrocarbon can be reused. The feeding of hydrogen can be made through a gas feeding channel. The contents of the subsequent step are not specifically limited herein.

An embodiment of implementation of the invention will be described in connection with the attached drawings.

FIG. 1 depicts a conceptional diagram of a screw feeder type catalytic reactor.

The reactor comprises a screw feeder 1 having a screw 1b incorporated in a screw feeder main body 1a. The screw 1b can be rotationally driven by an external motor 2.

Provided outside the screw feeder 1 is a pumping device 3 for feeding a low hydrocarbon such as methane. In this arrangement, the low hydrocarbon can be fed from the pumping device 3 to a gas inlet 4 provided at the upperstream side of the screw feeder main body 1a. The gas inlet 4 and the pumping device 3 constitute the low hydrocarbon feeding portion of the invention. The pumping device 3 also acts as a pressure adjusting unit. At the upperstream side of the screw feeder main body 1a is provided a catalyst injecting portion 5 to which a rotary feeder 6 is connected. To the rotary feeder 6 is connected a hopper 7 for receiving the catalyst. The catalyst injecting portion 5, the rotary feeder 6 and the hopper 7 constitute a catalyst feeding portion. The rotary feeder 6 also acts as a catalyst constant rate feeding device.

Around the screw feeder main body 1a is provided an electric heater 8 constituting a heating unit in such an arrangement that the electric heater 8 surrounds the screw feeder main body 1a. At the downstream side of the screw feeder main body 1a are provided a solid matter discharging portion 10 and a gas discharging portion 11. At the solid matter discharging portion 10, the catalyst used in the reaction and nanocarbon produced by the reaction which have been conveyed by the screw 1b are discharged out of the screw feeder main body 1a. At the gas discharging portion 11, hydrogen produced by the reaction and unreacted low hydrocarbon are discharged out of the screw feeder main body 1a. To the solid matter discharging portion 10 is connected a recovering portion 13 for recovering the catalyst and nanocarbon formed thereon. To the gas discharging portion 11 is connected a gas feeding pipe 15 through which hydrogen and unreacted low hydrocarbon are fed to the subsequent step.

A process for the production of nanocarbon using the aforementioned reactor will be described hereinafter.

Atomized nickel is received as unused catalyst 20 in the hopper 7. By operating the rotary feeder 6, the catalyst 20 is fed into the screw feeder main body 1a through the catalyst injecting portion 5 at a constant rate per unit time. Separately, the pumping device 3 pumps methane as a low hydrocarbon into the screw feeder main body 1a. During this procedure, the flow rate of methane is predetermined to be from 1,000 to 500,000 ml/g-catal./h as calculated in terms of SV value. The aforementioned feeding action is accompanied by the operation of the electric heater 8 that causes the heating of the interior of the screw feeder main body 1a to a temperature of from 400° C. to 900° C. The aforementioned feeding action is accompanied also by the operation of the motor 2 that causes the screw 1b to be rotated so that the contents can be conveyed from left to right as viewed on the drawing.

The catalyst received in the screw feeder main body 1a is conveyed downstream while being rotated as the screw 1b rotates. The catalyst 20 is brought into contact with the low hydrocarbon which is being fed into the screw feeder main body 1a in forward current or counter current while being conveyed by the screw 1b. In this manner, the low hydrocarbon is converted to hydrogen, unreacted gas and nanocarbon 30. During this procedure, the pressure in the screw feeder main body 1a is controlled to 10 atm or less. Inside the screw feeder main body 1a, nanocarbon grows and expands with the catalyst 20 as top as a result of decomposition of the low hydrocarbon while being conveyed downstream. The composite material 30 of nanocarbon with catalyst is discharged out of the screw feeder main body 1a through the solid matter discharging portion 10 from which it is then recovered by the recovering portion 13. Separately, hydrogen produced by the reaction and unreacted gas are discharged out of the screw feeder main body 1a through the gas discharging portion 11 from which they are then fed to the subsequent step through the gas feeding pipe 15.

In the aforementioned continuous operation, unused catalyst and low hydrocarbon are continuously fed. Separately, nanocarbon produced on the used catalyst, produced hydrogen and unreacted gas are discharged. In this manner, continuous decomposition reaction can be effected. Further, the same amount of the catalyst comes in and out of the screw feeder main body 1a which is a reactor, making it possible to keep a stable reaction proceeding at a constant conversion.

EXAMPLE

An example of reformation of methane using the screw feeder type catalytic reactor shown in FIG. 1 will be described below. In the present example, the temperature and pressure in the screw feeder main body were adjusted to 650° C. and 0.2 MPaG, respectively, and the flow rate of methane was predetermined to about 3,000 ml/g-Ni/h as calculated in terms of SV value.

Figure 2:
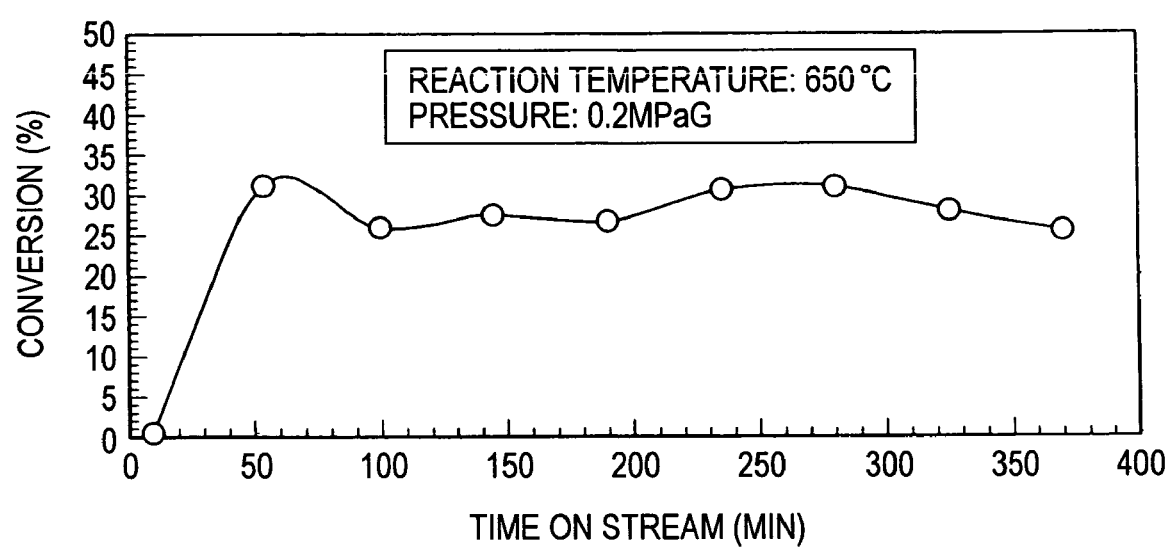
FIG. 2 is a diagram illustrating the change of methane conversion with time during the reformation of methane in the example.

The relationship between the time on stream of operation and the conversion is shown in FIG. 2. In general, the catalytic properties deteriorate with time. In the present example, however, the conversion remains constant because unused catalyst is continuously fed. It was also made obvious that unused catalyst is fed at a constant rate by a screw feeder while the resulting nanocarbon is being extruded without clogging the feeder, allowing continuous progress of reaction without clogging the reaction pipe.

Figure 3:
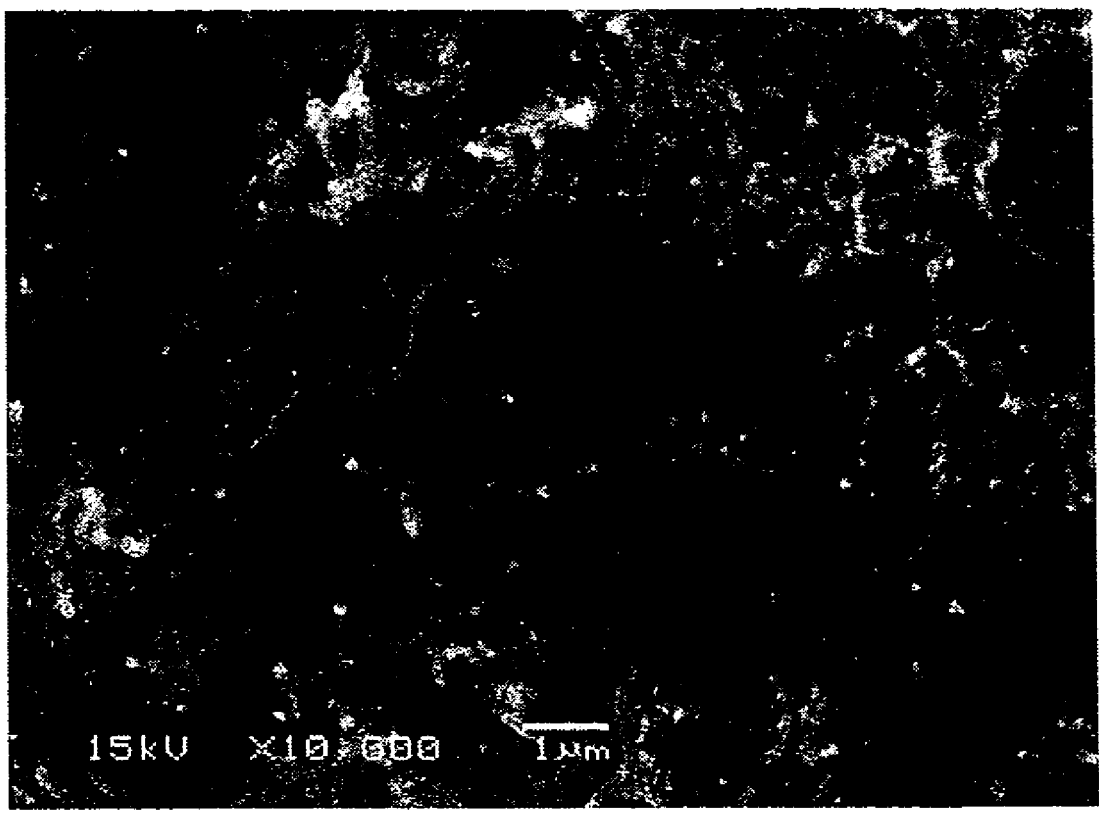
FIG. 3 is a photograph which is a substitute for drawing illustrating nanocarbon obtained in the example.

FIG. 3 is a SEM photograph of nanocarbon produced by the reaction. This SEM photograph demonstrates that functional nanocarbon having a diameter on the order of nanometer is produced.

Figure 4:
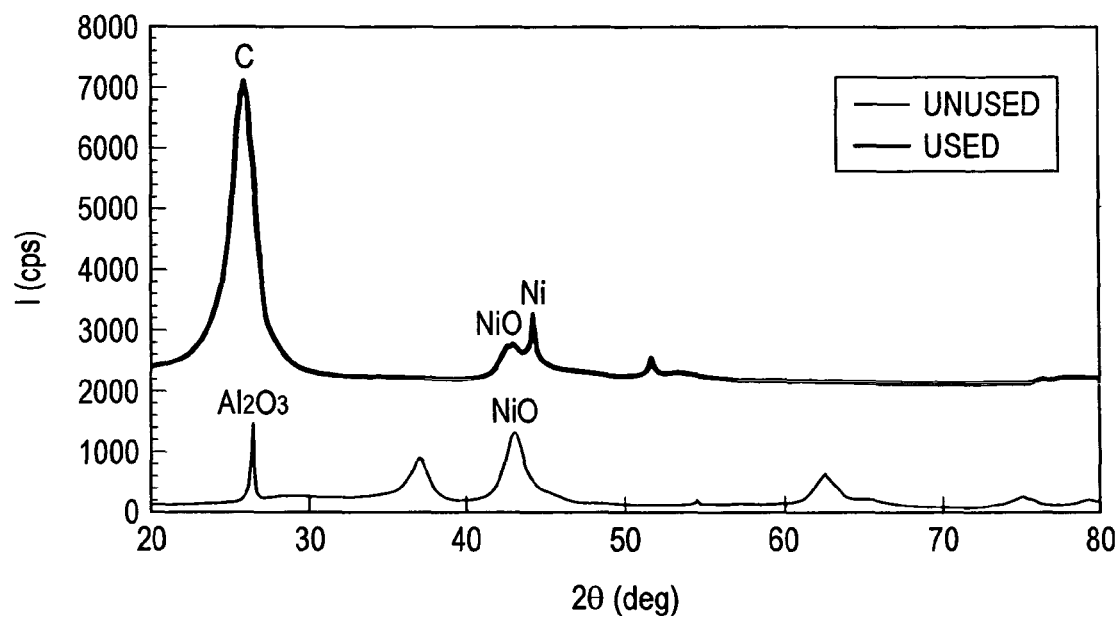
FIG. 4 is a diagram illustrating the results of XRD analysis of catalyst before and after decomposition of methane in the example.

FIG. 4 is an example of the results of XRD analysis of unused catalyst and used catalyst containing produced nanocarbon. As can be seen in the results, the used catalyst has carbon produced by decomposition of methane observed in the vicinity of $2\theta$ ($=26°$), which carbon is not seen in the unused catalyst, demonstrating that nanocarbon is effectively produced.

While the invention has been described with reference to the aforementioned embodiment and example, the invention is not limited thereto. Proper changes can be made within the scope of the invention.

What is claimed is:

1. A method for producing nanocarbon comprising:
   feeding a low hydrocarbon and a catalyst through a screw feeder having a main body continuously in such a manner that the low hydrocarbon and the catalyst are brought into contact with each other in a forward current or counter flow;
   pyrolyzing the low hydrocarbon over the catalyst in the screw feeder to produce the nanocarbon on the catalyst;
   conveying a composite of the nanocarbon and the catalyst continuously by the screw toward a downstream side of the screw feeder; and
   discharging the composite out of the screw feeder,
   wherein all of the nanocarbon produced is produced in the screw feeder.

2. The method for producing nanocarbon according to claim 1, wherein the catalyst comprises a first metal comprising at least one of nickel and iron.

3. The method for producing nanocarbon according to claim 2, wherein the catalyst comprises a metal, in which a second metal comprising at least one of palladium and cobalt is added to the first metal.

4. The method for producing nanocarbon according to claim 1, wherein the low hydrocarbon is passed through the screw feeder at an SV value of from 1,000 to 500,000 ml/g-catal./h with respect to the catalyst packed in the screw feeder while the screw feeder is being adjusted to a temperature of from 400° C. to 900° C. and a pressure of 10 atm or less.

5. The method for producing nanocarbon according to claim 1, wherein the catalyst is spherical, foil-shaped, whisker-shaped or amorphous, singly or in combination.

6. The method for producing nanocarbon according to claim 1, further comprising prolonging a residence time of produced nanocarbon in the screw feeder by at least one of controlling a rotary speed of the screw and operating the screw back and forth so as to raise a carbon to metal ratio which represents a degree of growth of carbon.

7. The method for producing nanocarbon according to claim 1, wherein said feeding, pyrolyzing, conveying and discharging are conducted in an enclosed single stage of a chamber of the main body of the screw feeder.

8. The method for producing nanocarbon according to claim 1, wherein said feeding, pyrolyzing, conveying and discharging are conducted in a screw feeder type catalytic reactor.

* * * * *